US012592471B2

(12) United States Patent
Yoshikawa

(10) Patent No.: US 12,592,471 B2
(45) Date of Patent: Mar. 31, 2026

(54) COMPOSITE RESONATOR AND ASSEMBLY

(71) Applicant: KYOCERA CORPORATION, Kyoto (JP)

(72) Inventor: Hiromichi Yoshikawa, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 182 days.

(21) Appl. No.: 18/555,865

(22) PCT Filed: Dec. 9, 2021

(86) PCT No.: PCT/JP2021/045392
§ 371 (c)(1),
(2) Date: Oct. 18, 2023

(87) PCT Pub. No.: WO2022/224483
PCT Pub. Date: Oct. 27, 2022

(65) Prior Publication Data

US 2024/0213648 A1 Jun. 27, 2024

(30) Foreign Application Priority Data

Apr. 19, 2021 (JP) ................................ 2021-070374

(51) Int. Cl.
*H01P 7/06* (2006.01)
*H01P 1/203* (2006.01)

(52) U.S. Cl.
CPC .............. *H01P 7/065* (2013.01); *H01P 1/203* (2013.01)

(58) Field of Classification Search
CPC ........ H01P 1/065; H01P 1/203; H01P 1/2005; H01P 1/20345; H01P 7/065
(Continued)

(56) References Cited

U.S. PATENT DOCUMENTS 5,084,647 A 1/1992 Inoue et al.
6,426,722 B1 7/2002 Sievenpiper et al.
(Continued)

FOREIGN PATENT DOCUMENTS

JP 2003526978 A 9/2003
JP 2015231182 A 12/2015
(Continued)

OTHER PUBLICATIONS

Kaouach, H et al., "Design and Characterization of Wideband High-Efficiency Unit Cells for Frequency Selective Surfaces in 10GHz-Band," 2015 International Conference on Electromagnetics in Advanced Applications (ICEAA), IEEE, Sep. 7, 2015, pp. 149-152.
(Continued)

*Primary Examiner* — Andrea Lindgren Baltzell
*Assistant Examiner* — Abigail Amir Yaldo
(74) *Attorney, Agent, or Firm* — HAUPTMAN HAM, LLP

(57) ABSTRACT

A composite resonator includes a first resonator extending in a first plane direction, a second resonator spaced apart from the first resonator in a first direction and extending in the first plane direction, a third resonator located between the first resonator and the second resonator in the first direction and configured to magnetically or capacitively connect to or electrically connect to each of the first resonator and the second resonator, and a reference conductor extending in the first plane direction, located between the first resonator and the second resonator in the first direction, and serving as a potential reference of the first resonator and the second resonator. The reference conductor surrounds at least a part of the third resonator in the first plane direction.

14 Claims, 15 Drawing Sheets

(58) Field of Classification Search
USPC .......................................................... 333/202
See application file for complete search history.

(56) References Cited

U.S. PATENT DOCUMENTS

| | | | |
|---|---|---|---|
| 6,483,481 | B1 | 11/2002 | Sievenpiper et al. |
| 7,460,072 | B1 | 12/2008 | Goldberger |
| 10,826,188 | B2 | 11/2020 | Kristou et al. |
| 2007/0279143 | A1 | 12/2007 | Itsuji |
| 2008/0266018 | A1 | 10/2008 | Han et al. |
| 2009/0071709 | A1 | 3/2009 | Han et al. |
| 2012/0032760 | A1* | 2/2012 | Wurth ................. H01P 1/20327 333/204 |
| 2018/0301807 | A1 | 10/2018 | Clemente et al. |
| 2019/0044244 | A1 | 2/2019 | Kristou et al. |
| 2019/0165475 | A1 | 5/2019 | Shibata |
| 2020/0145038 | A1 | 5/2020 | Onaka et al. |
| 2020/0168996 | A1 | 5/2020 | Nasimuddin et al. |
| 2024/0213640 | A1 | 6/2024 | Yoshikawa |

FOREIGN PATENT DOCUMENTS

| | | | |
|---|---|---|---|
| KR | 200354132 | Y1 | 6/2004 |
| KR | 100851075 | B1 | 8/2008 |
| KR | 10-2009-0029573 | A | 3/2009 |

OTHER PUBLICATIONS

Kaouach, H. et al., "Design and demonstration of an X-band transmit-array", https://ieeecplore.ieee.org/stampPDF.jsp; Mar. 23, 2009, 5 pp.

Xie, Peng et al., "Circularly Polarized Fabry-Perot Antenna Employing a Receiver-Transmitter Polarization Conversion Metasurface", IEEE Transactions on Antennas and Propagation, IEEE, USA, vol. 68, No. 4, Nov. 6, 2019, pp. 3213-3218.

* cited by examiner

COMPOSITE RESONATOR AND ASSEMBLY

CROSS-REFERENCE TO RELATED APPLICATIONS

This application is national stage application of International Application No. PCT/JP2021/045392, filed on Dec. 9, 2021, which claims priority to Japanese Patent Application No. 2021-070374, filed on Apr. 19, 2021.

TECHNICAL FIELD

The present disclosure relates to a composite resonator and an assembly.

BACKGROUND OF INVENTION

A known technique involves controlling electromagnetic waves without using a dielectric lens. For example, Patent Document 1 describes a technique of refracting radio waves by changing parameters of respective elements in a structure including an array of resonator elements.

CITATION LIST

Patent Literature

Patent Document 1: JP 2015-231182 A

SUMMARY

Summary of the Invention

In the resonator elements described in Patent Document 1, even when the parameters of respective elements are changed, a maximum amount of change in phase is 180°. There is a need to provide a resonator element which can form an assembly having a high degree of design freedom.

An objective of the present disclosure is to provide a composite resonator and an assembly that can be made with a high degree of design freedom.

Solution to Problem

In the present disclosure, a composite resonator includes a first resonator extending in a first plane direction, a second resonator spaced apart from the first resonator in a first direction and extending in the first plane direction, a third resonator located between the first resonator and the second resonator in the first direction and configured to magnetically or capacitively connect to or electrically connect to each of the first resonator and the second resonator, and a reference conductor extending in the first plane direction, located between the first resonator and the second resonator in the first direction, and serving as a potential reference of the first resonator and the second resonator, and the reference conductor surrounds at least a part of the third resonator in the first plane direction.

An assembly according to the present disclosure includes a plurality of the composite resonators according to the present disclosure, in which the plurality of composite resonators are arranged in the first plane direction.

Advantageous Effect

According to the present disclosure, a composite resonator which can form an assembly having a high degree of design freedom can be provided.

DESCRIPTION OF EMBODIMENTS

Embodiments of the present disclosure will be described in detail with reference to the drawings. The embodiments described below do not limit the present disclosure.

In the following description, an XYZ orthogonal coordinate system is set, and the positional relationship between respective portions will be described by referring to the XYZ orthogonal coordinate system. A direction parallel to an X-axis in a horizontal plane is defined as an X-axis direction, a direction parallel to a Y-axis orthogonal to the X-axis in the horizontal plane is defined as a Y-axis direction, and a direction parallel to a Z-axis orthogonal to the horizontal plane is defined as a Z-axis direction. A plane including the X-axis and the Y-axis is appropriately referred to as an XY plane, a plane including the X-axis and the Z-axis is appropriately referred to as an XZ plane, and a plane including the Y-axis and the Z-axis is appropriately referred to as a YZ plane. The XY plane is parallel to the horizontal plane. The XY plane, the XZ plane, and the YZ plane are orthogonal to each other.

Overview

Figure 1:
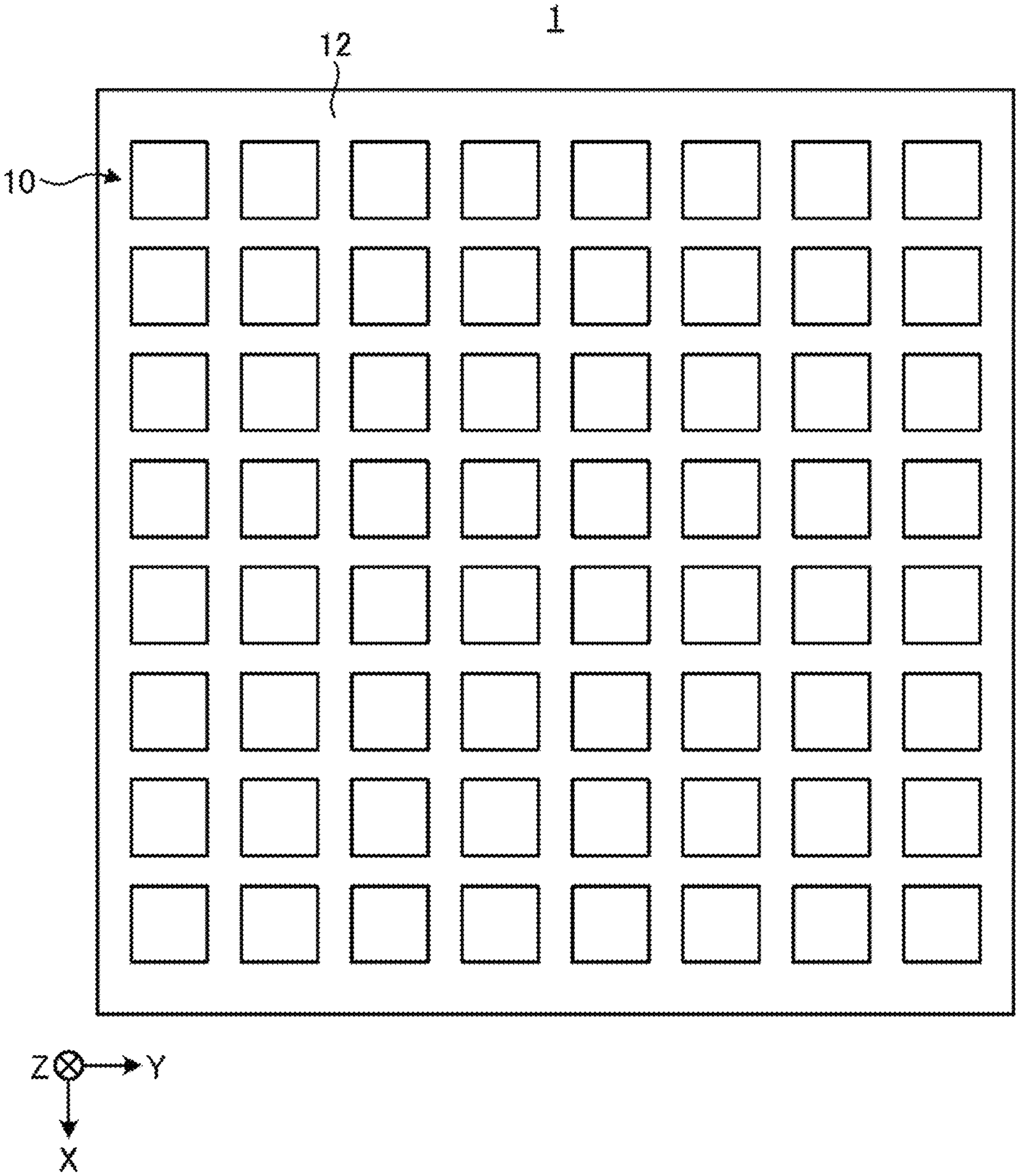
FIG. 1 is a diagram illustrating an overview of an assembly according to each embodiment.

FIG. 1 illustrates an assembly in which a plurality of composite resonators are periodically arranged. In the assembly, the plurality of composite resonators periodically arranged function as an assembly. For example, the assembly functions as a spatial filter plate for a plane wave. For example, the assembly functions as a radio wave refraction plate by generating a phase difference in the plurality of composite resonators.

As illustrated in FIG. 1, an assembly 1 includes a plurality of unit structures 10 and a substrate 12.

The plurality of unit structures 10 are arranged in an XY plane direction. The XY plane direction may also be referred to as a first plane direction. That is, the plurality of unit structures 10 are arranged two-dimensionally. Each of the plurality of unit structures 10 has a resonance structure. The structure of the unit structure 10 will be described later. The unit structure 10 may be referred to as a composite resonator. The substrate 12 may be, for example, a dielectric substrate made of a dielectric body. The assembly 1 is made by two-dimensionally arranging the plurality of unit structures 10 having the resonance structure on the substrate 12 made of the dielectric body.

In the present disclosure, the assembly can be made by arranging the composite resonators of the following embodiments as illustrated in FIG. 1.

First Embodiment

Configuration of Unit Structure

Figure 2:
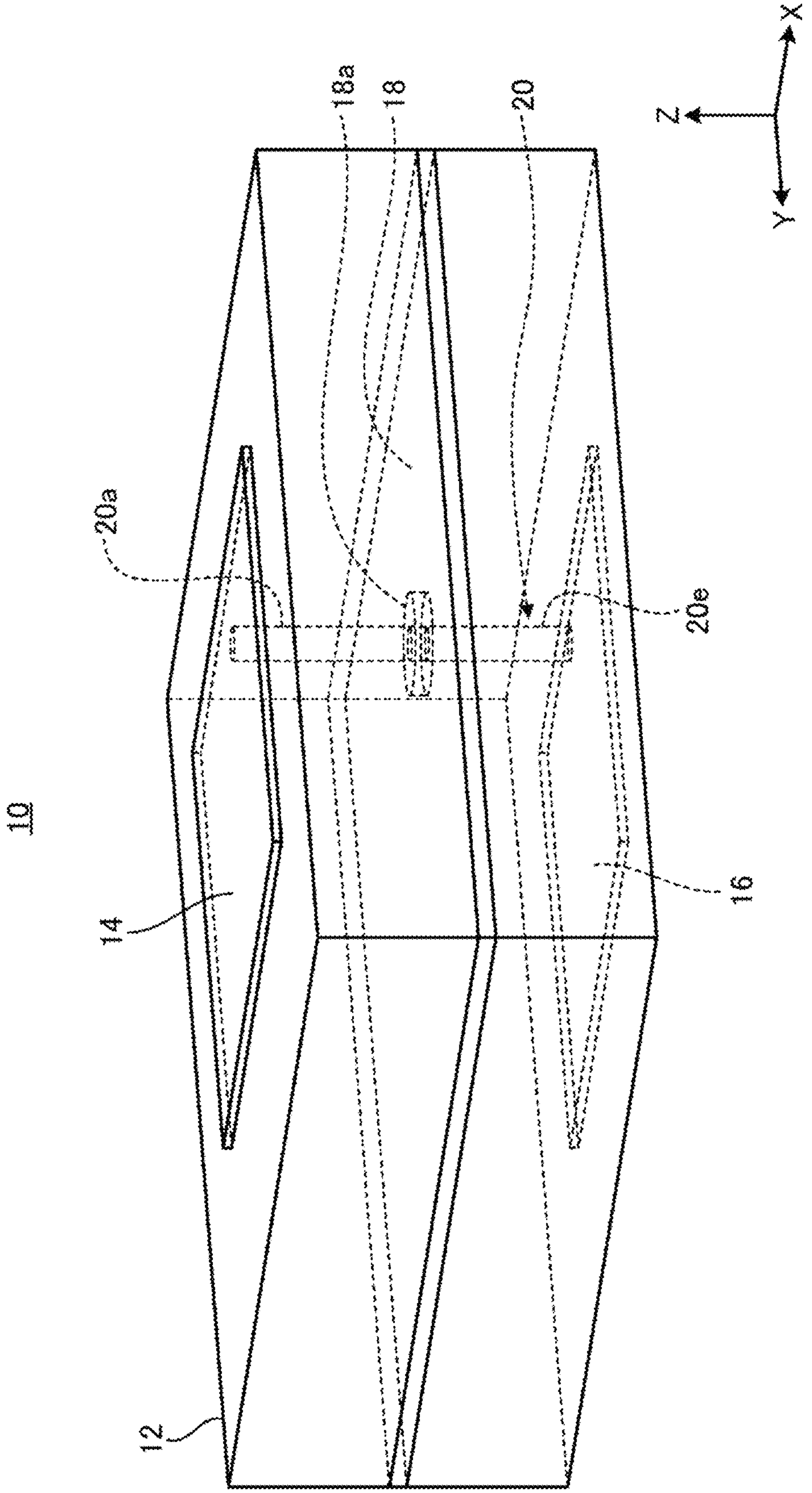
FIG. 2 is a diagram schematically illustrating a configuration example of a unit structure according to a first embodiment.

A configuration example of the unit structure according to a first embodiment will be described with reference to FIG. 2. FIG. 2 is a diagram schematically illustrating the configuration example of the unit structure according to the first embodiment.

As illustrated in FIG. 2, the unit structure 10 includes a first resonator 14, a second resonator 16, a reference conductor 18, and a connection line path 20.

The first resonator 14 may be arranged on the substrate 12, extending on the XY plane. The first resonator 14 may be made of a conductor. The first resonator 14 may be, for example, a patch conductor formed in a rectangular shape. In the example illustrated in FIG. 2, the first resonator 14 is illustrated as the rectangular patch conductor, but the present disclosure is not limited thereto. The first resonator 14 may have, for example, a linear shape, a circular shape, a loop shape, or a polygonal shape other than a rectangular shape. That is, the shape of the first resonator 14 may be arbitrarily changed according to the design. The first resonator 14 resonates by an electromagnetic wave received from the +Z-axis direction.

The first resonator 14 radiates an electromagnetic wave during resonance. The first resonator 14 radiates the electromagnetic wave to the +Z-axis direction side during resonance.

The second resonator 16 may be arranged on the substrate 12 to extend on the XY plane at a position away from the first resonator 14 in the Z-axis direction. The second resonator 16 may be, for example, a patch conductor formed in a rectangular shape. In the example illustrated in FIG. 2, the second resonator 16 is illustrated as the rectangular patch conductor, but the present disclosure is not limited thereto. The second resonator 16 may have, for example, a linear shape, a circular shape, a loop shape, or a polygonal shape other than a rectangular shape. That is, the shape of the second resonator 16 may be arbitrarily changed according to the design. The shape of the second resonator 16 may be the same as or different from the shape of the first resonator 14. The area of the second resonator 16 may be the same as or different from the area of the first resonator 14.

The second resonator 16 radiates an electromagnetic wave during resonance. The second resonator 16, for example, radiates the electromagnetic wave to the −Z-axis direction side. The second resonator 16 radiates the electromagnetic wave to the −Z-axis direction side during resonance. The second resonator 16 resonates by receiving the electromagnetic wave from the −Z-axis direction.

The second resonator 16 may resonate at a phase different from that of the first resonator 14. The second resonator 16 may resonate in a direction different from the resonance direction of the first resonator 14 in the XY plane direction. For example, when the first resonator 14 resonates in the X-axis direction, the second resonator 16 may resonate in the Y-axis direction. The resonance direction of the second resonator 16 may change with time in the XY plane direction corresponding to a change with time in the resonance direction of the first resonator 14. The second resonator 16 may radiate the electromagnetic wave received by the first resonator 14 with a first frequency band thereof attenuated.

The reference conductor 18 may be arranged between the first resonator 14 and the second resonator 16 in the substrate 12. The reference conductor 18 may be, for example, at the center between the first resonator 14 and the second resonator 16 in the substrate 12, but the present disclosure is not limited thereto. For example, the reference conductor 18 may be at a position where the distance from the reference conductor 18 to the first resonator 14 differs from the distance from the reference conductor 18 to the second resonator 16. The reference conductor 18 has a through-hole 18*a* through which the connection line path 20 extends. The reference conductor 18 surrounds at least a part of the connection line path 20.

The connection line path 20 may be made of a conductor. The connection line path 20 is located between the first resonator 14 and the second resonator 16 in the Z-axis direction. The Z-axis direction may also be referred to as a first direction, for example. The connection line path 20 may be connected to each of the first resonator 14 and the second resonator 16. Although the connection line path 20 passes through the through-hole 18*a*, the connection line path 20 is not in contact with the reference conductor 18. The connection line path 20 may be magnetically or capacitively connected to each of the first resonator 14 and the second resonator 16, for example. For example, the connection line path 20 may be electrically connected to each of the first resonator 14 and the second resonator 16. The connection line path 20 is connected to a side of the first resonator 14 parallel to the X-axis direction and is connected to a side of the second resonator 16 parallel to the X-axis direction. The connection line path 20 may be a path parallel to the Z-axis direction. The connection line path 20 may be a third resonator.

The unit structure 10 magnetically or capacitively connects the first resonator 14 and the second resonator 16 or electrically connects them to be combined. By combining the three resonators, the unit structure 10 transmits a high frequency excited by an electromagnetic wave incident on the first resonator 14 through the composite resonator. The unit structure 10 may have any one or more functions of a phase shift, a band-pass filter, a high-pass filter, and a low-pass filter depending on the transmission characteristics of the unit structure.

The unit structure 10 changes the phase of the electromagnetic wave incident on the first resonator 14 and radiates the electromagnetic wave from the second resonator 16. The amount of change in phase changes depending on the length of the connection line path 20. The amount of change in phase also changes depending on the area of the first resonator 14 or the second resonator 16.

Figure 3:
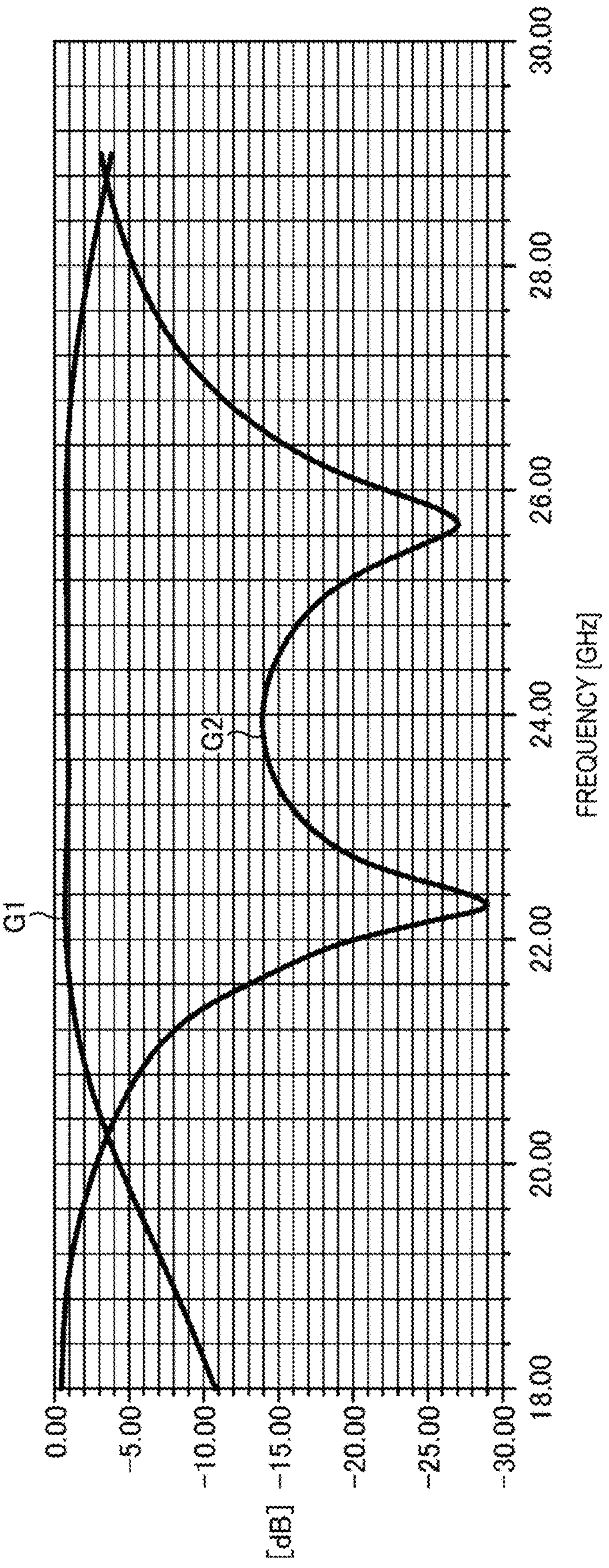
FIG. 3 is a graph showing frequency characteristics of the unit structure according to the first embodiment.

Frequency characteristics of the unit structure according to the first embodiment will be described with reference to FIG. 3. FIG. 3 is a graph showing the frequency characteristics of the unit structure according to the first embodiment.

In FIG. 3, the horizontal axis represents the frequency [Giga Hertz (GHz)] and the vertical axis represents the gain [deci Bel (dB)]. FIG. 3 shows a graph G1 and a graph G2. The graph G1 shows a transmission coefficient. The graph G2 shows a reflection coefficient. The graph G1 shows that insertion loss in a region from around 21.00 GHz to around 28.00 GHz is −3 dB or more and transmission characteristics are satisfactory. The graph G2 shows that the reflection coefficient in the region from around 21.00 GHz to around 28.00 GHz is low. That is, the unit structure 10 illustrated in FIG. 1 has satisfactory transmission characteristics over a wide range from around 21.00 GHz to around 28.00 GHz.

Figure 4:
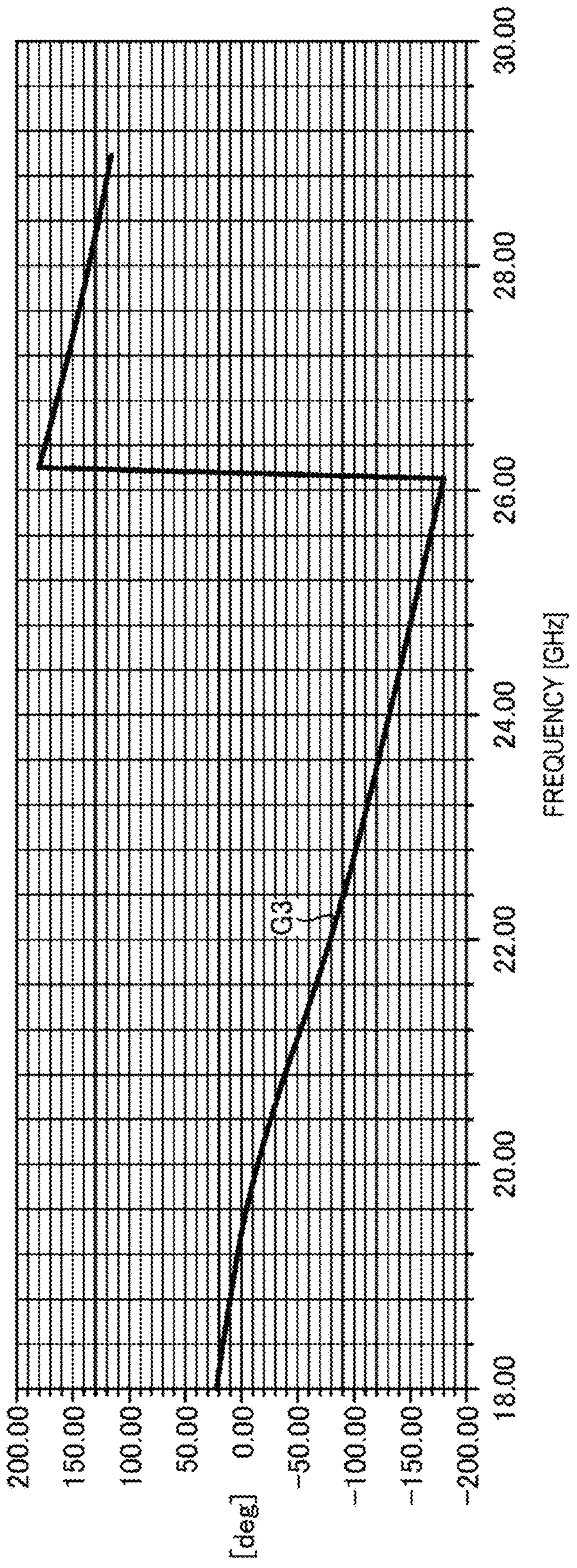
FIG. 4 is a graph showing an amount of change in phase of the unit structure according to the first embodiment.

The amount of change in phase of the unit structure according to the first embodiment will be described with reference to FIG. 4. FIG. 4 is a graph showing the amount of change in phase of the unit structure according to the first embodiment.

In FIG. 4, the horizontal axis represents the frequency [GHz] and the vertical axis represents the amount of change in phase [deg]. FIG. 4 shows a graph G3. The graph G3 shows the amount of shift in phase of the electromagnetic wave when the electromagnetic wave incident on the first resonator 14 is radiated from the second resonator 16. For example, when the electromagnetic wave having a frequency around 22.00 GHz is incident on the first resonator 14, the unit structure 10 shifts the phase of the electromagnetic wave by about −80° and radiates the electromagnetic wave from the second resonator 16. For example, when the electromagnetic wave having a frequency around 24.00 GHz is incident on the first resonator 14, the unit structure 10 shifts the phase of the electromagnetic wave by about −130° and radiates the electromagnetic wave from the second resonator 16. For example, when the electromagnetic wave having a frequency in around 28.00 GHz is incident on the first resonator 14, the unit structure 10 shifts the phase of the electromagnetic wave by about 135° and radiates the electromagnetic wave from the second resonator 16. The unit structure 10 can be used as a spatial filter. The unit structure 10 can obtain a desired phase difference between the elements by shifting a design value of a center frequency of the spatial filter.

The unit structures 10 are arranged in the assembly 1, and thus the electromagnetic wave transmitted through the assembly 1 is shifted. For example, the electromagnetic wave passing through the assembly 1 is shifted by about 22° at a frequency of 18.00 GHz. For example, the electromagnetic wave passing through the assembly 1 is shifted by about −130° at a frequency of 24.00 GHz. For example, the electromagnetic wave passing through the assembly 1 is shifted by about 135° at a frequency of 28 GHz.

Second Embodiment

Configuration of Unit Structure

Figure 5:
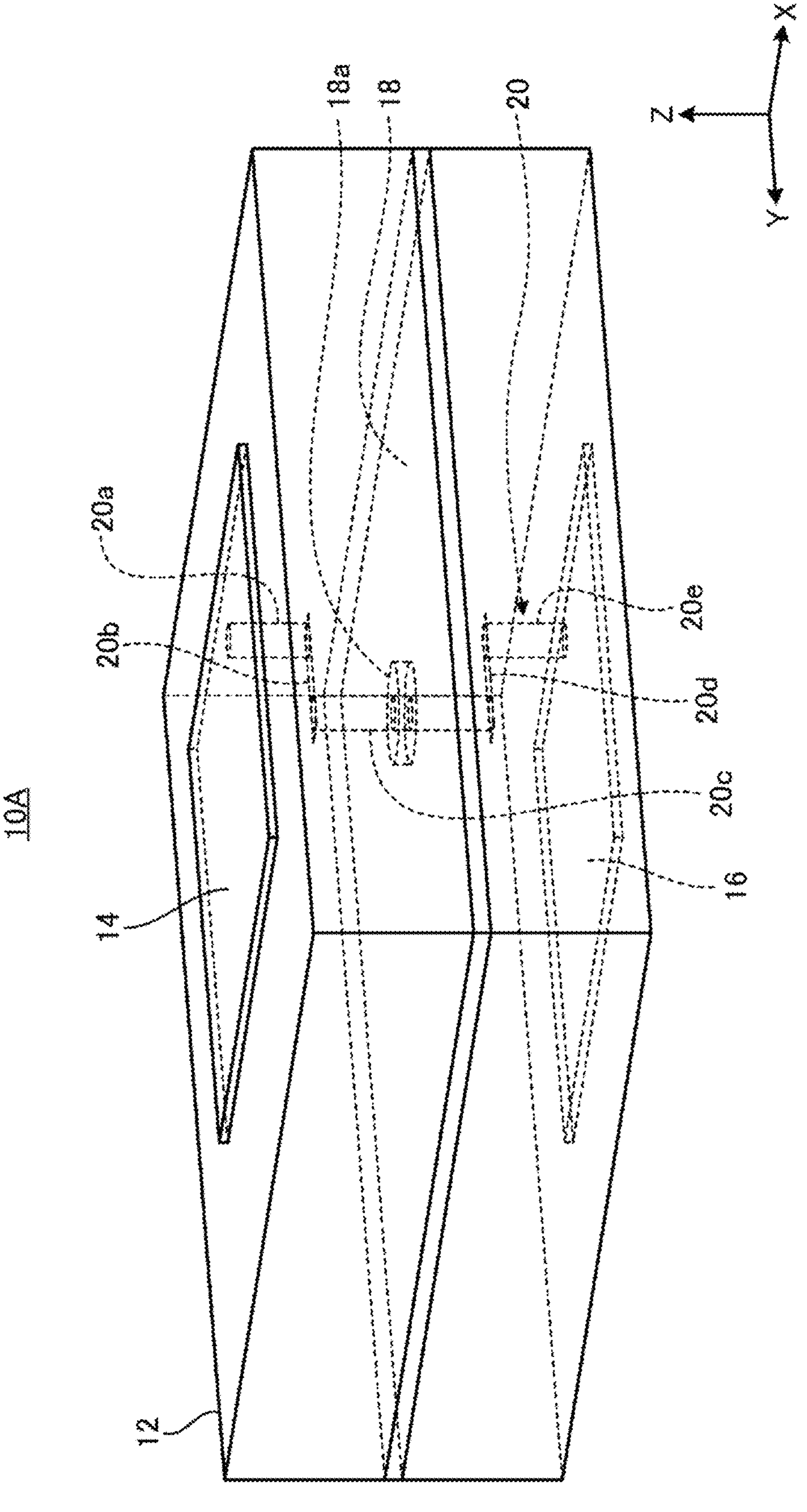
FIG. 5 is a diagram schematically illustrating a configuration example of a unit structure according to a second embodiment.

A configuration example of a unit structure according to a second embodiment will be described with reference to FIG. 5. FIG. 5 is a diagram schematically illustrating the configuration example of the unit structure according to the second embodiment.

As illustrated in FIG. 5, a unit structure 10A differs from the unit structure 10 illustrated in FIG. 2 in that the connection line path 20 is not a linear path parallel to the Z-axis direction. Specifically, the connection line path 20 of the unit structure 10A differs from the unit structure 10 illustrated in FIG. 2 in that the connection line path 20 includes a first path portion 20*a*, a second path portion 20*b*, a third path portion 20*c*, a fourth path portion 20*d*, and a fifth path portion 20*e*.

The first path portion 20*a* may be a path parallel to the Z-axis direction and including one end connected to the first resonator 14 and the other end located between the first resonator 14 and the reference conductor 18. The second path portion 20*b* may be a path parallel to the XY plane and including one end connected to the other end of the first path portion 20*a* and the other end located between the first resonator 14 and the reference conductor 18. The third path portion 20*c* may be a path parallel to the Z-axis direction and including one end connected to the other end of the second path portion 20*b* and the other end located between the second resonator 16 and the reference conductor 18. The third path portion 20*c* passes through the through-hole 18*a* of the reference conductor 18. The third path portion 20*c* is not in contact with the reference conductor 18. The fourth path portion 20*d* may be a path parallel to the XY plane and including one end connected to the other end of the third path portion 20*c* and the other end located between the second resonator 16 and the reference conductor 18. The fifth path portion 20*e* may be a path parallel to the Z-axis direction and including one end connected to the fourth path portion 20*d* and the other end connected to the fifth path portion 20*e*.

In FIG. 5, the connection line path 20 has been described as including the five paths from the first path portion 20*a* to the fifth path portion 20*e*, but this is merely an example and does not limit the present disclosure. The number of paths included in the connection line path 20 may be more or less than five. The plurality of path portions may also be referred to as sub-resonators. For example, the connection line path 20 may have a bent portion being bent in a curved shape.

The unit structure 10A changes the phase of the electromagnetic wave incident on the first resonator 14 and radiates the electromagnetic wave from the second resonator 16. The amount of change in phase changes depending on the length of the connection line path 20. The amount of change in phase also changes depending on the area of the first resonator 14 or the second resonator 16.

Figure 6:
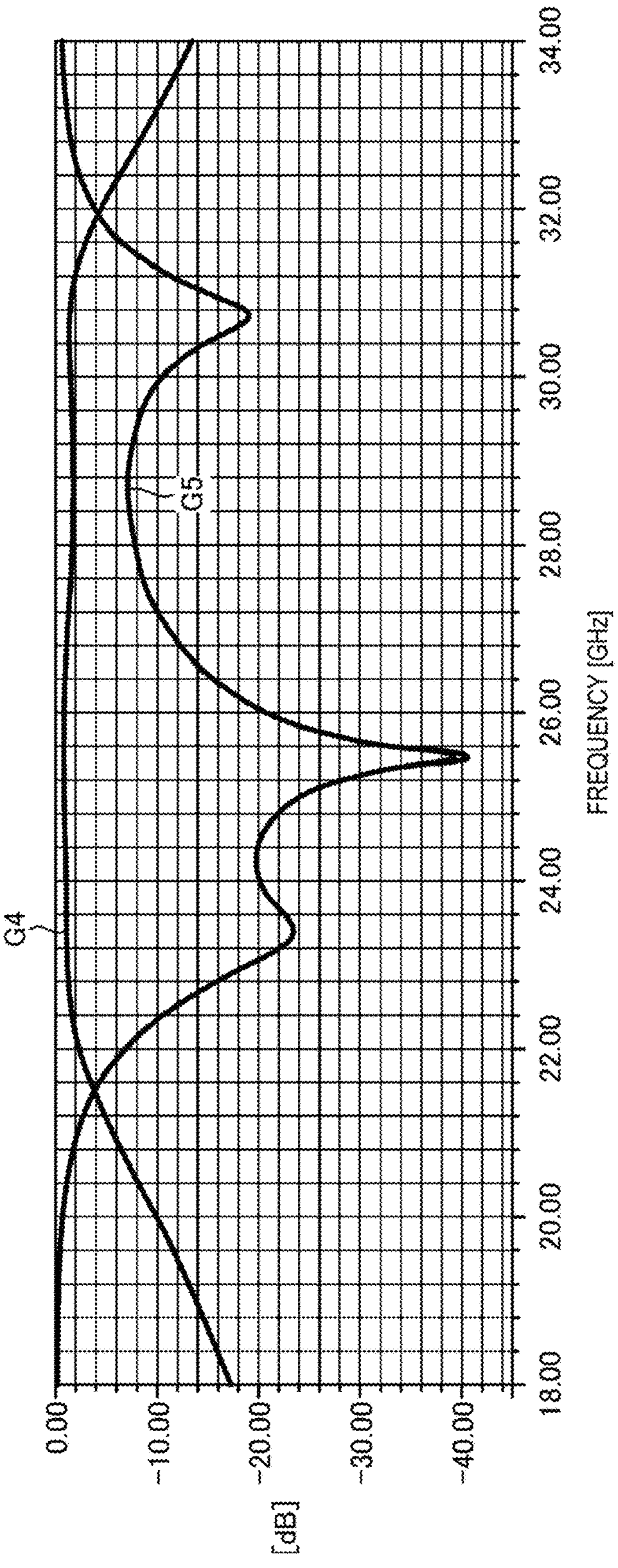
FIG. 6 is a graph showing frequency characteristics of a unit structure according to a second embodiment.

Frequency characteristics of the unit structure according to the second embodiment will be described with reference to FIG. 6. FIG. 6 is a graph showing frequency characteristics of the unit structure according to the second embodiment.

In FIG. 6, the horizontal axis represents the frequency [GHz] and the vertical axis represents the gain [dB]. FIG. 6 shows a graph G4 and a graph G5. The graph G4 shows a transmission coefficient. The graph G5 shows a reflection coefficient. The graph G4 shows that insertion loss in a region from around 22.00 GHz to around 31.40 GHz is −3 dB or more and transmission characteristics are satisfactory. The graph G5 shows that the reflection coefficient in the region from around 22.00 GHz to around 31.40 GHz is low. That is, the unit structure 10A illustrated in FIG. 5 has satisfactory transmission characteristics over a wide range from around 22.00 GHz to around 31.40 GHz.

Figure 7:
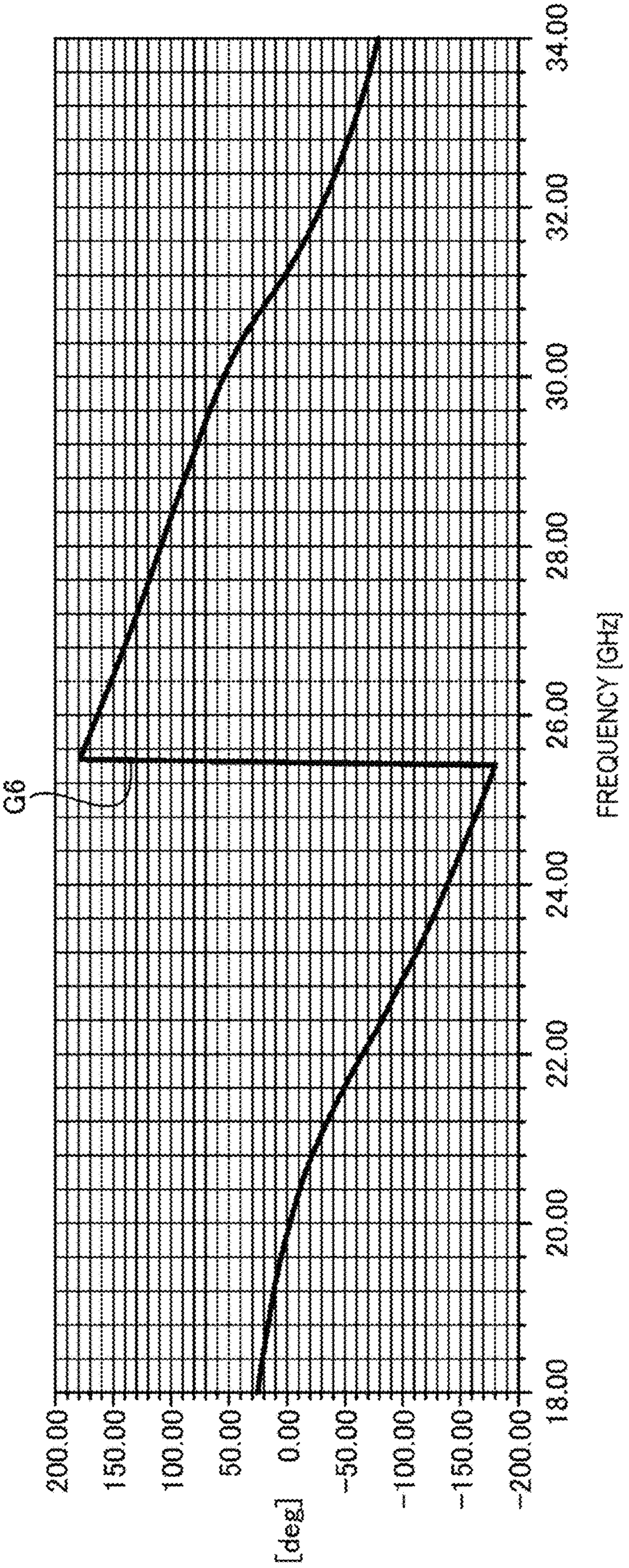
FIG. 7 is a graph showing an amount of change in phase of the unit structure according to the second embodiment.

An amount of change in phase of the unit structure according to the second embodiment will be described with reference to FIG. 7. FIG. 7 is a graph showing the amount of change in phase of the unit structure according to the second embodiment.

In FIG. 7, the horizontal axis represents the frequency [GHz] and the vertical axis represents the amount of change in phase [deg]. FIG. 7 shows a graph G6. The graph G6 shows the amount of shift in phase of the electromagnetic wave when the electromagnetic wave incident on the first resonator 14 is radiated from the second resonator 16. For example, when the electromagnetic wave having a frequency around 22.00 GHz is incident on the first resonator 14, the unit structure 10A shifts the phase of the electromagnetic wave by about −65° and radiates the electromagnetic wave from the second resonator 16. For example, when the electromagnetic wave having a frequency in around 24.00 GHz is incident on the first resonator 14, the unit structure 10 shifts the phase of the electromagnetic wave by about −140° and radiates the electromagnetic wave from the second resonator 16. For example, when the electromagnetic wave having a frequency in around 28.00 GHz is incident on the first resonator 14, the unit structure 10 shifts the phase of the electromagnetic wave by about 110° and radiates the electromagnetic wave from the second resonator 16. That is, the unit structure 10A can be used as a spatial filter changing the phase of the electromagnetic wave.

The unit structures 10A are arranged in the assembly 1, and thus the electromagnetic wave transmitted through the assembly 1 is shifted. For example, the electromagnetic wave passing through the assembly 1 is shifted by about −65° at a frequency of 22.00 GHz. For example, the electromagnetic wave passing through the assembly 1 is shifted by about −140° at a frequency of 24.00 GHz. For example, the electromagnetic wave passing through the assembly 1 is shifted by about 110° at a frequency of 28.00 GHz.

The unit structure 10 can obtain a desired phase difference between the elements by arranging the elements having shifted design value of the center frequency of the spatial filter. When the unit structure 10 and the unit structure 10A are arranged side by side in the assembly 1, a difference between phases in which electromagnetic waves transmitted through the unit structures 10 and 10A, respectively, are shifted is generated. For example, at the frequency 22.00 GHz, the phases of electromagnetic waves transmitted through the two unit structures 10 and 10A are shifted by about 22° and about −65°, respectively, and the phase difference is 85°. For example, at a frequency of 24.00 GHZ, the phases of electromagnetic waves transmitted through the two unit structures 10 and 10A are shifted by about −130° and about −140°, respectively, and the phase difference is 10°. For example, at a frequency of 28.00 GHz, the phases of electromagnetic waves transmitted through the two unit structures 10 and 10A are shifted by about 135° and about 110°, respectively, and the phase difference is 25°.

Third Embodiment

Configuration of Unit Structure

Figure 8:
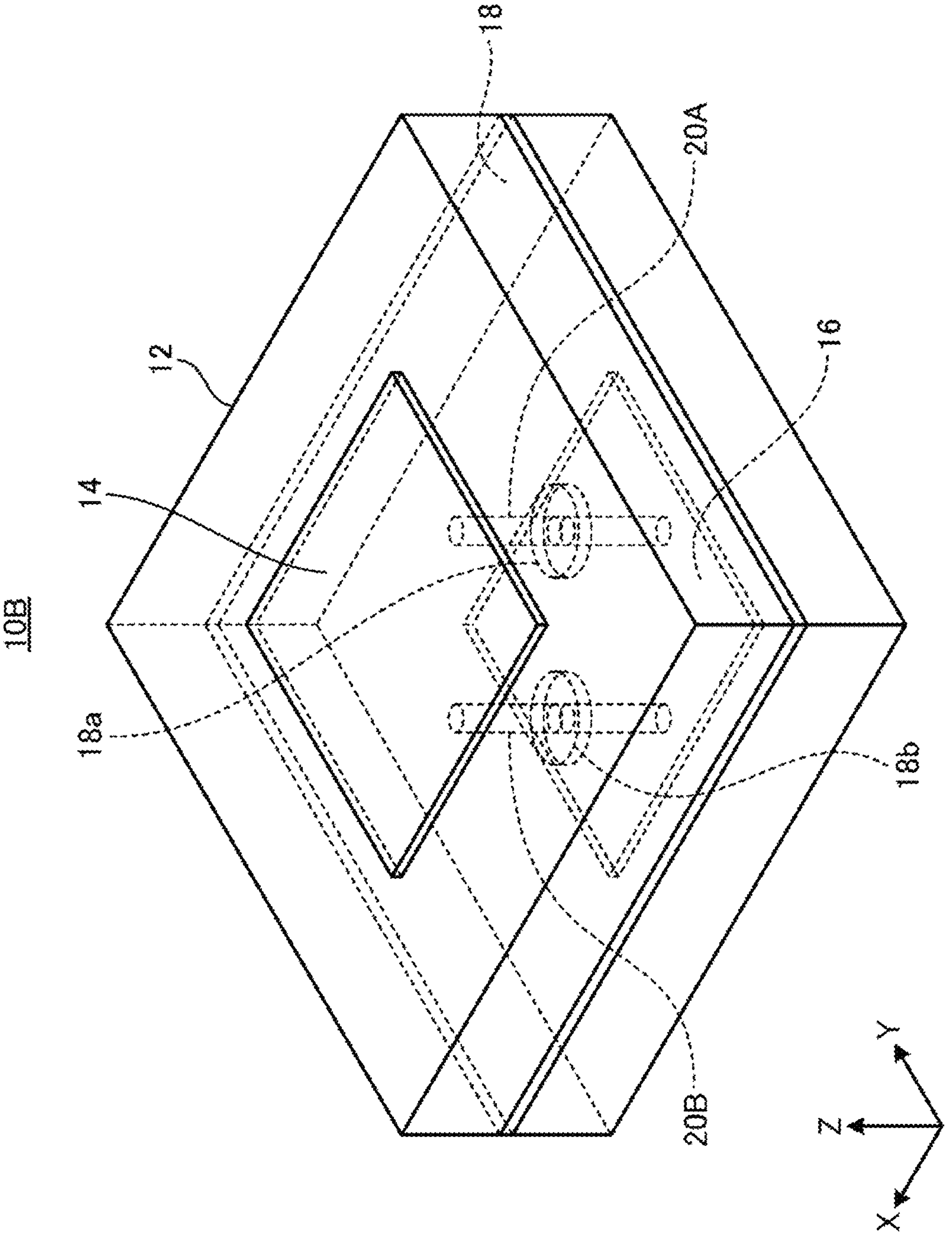
FIG. 8 is a diagram schematically illustrating a configuration example of a unit structure according to a third embodiment.

A configuration example of the unit structure according to a third embodiment will be described with reference to FIG. 8. FIG. 8 is a diagram schematically illustrating the configuration example of the unit structure according to the third embodiment.

As illustrated in FIG. 8, a unit structure 10B differs from the unit structure 10 illustrated in FIG. 2 in that the unit structure 10B includes a connection line path 20A and a connection line path 20B.

In the unit structure 10B, the reference conductor 18 includes a through-hole 18*a* and a through-hole 18*b*. The through-hole 18*a* is a through-hole through which the connection line path 20A passes. The through-hole 18*b* is a through-hole through which the connection line path 20B passes.

The connection line path 20A may be made of a conductor. The connection line path 20A is located between the first resonator 14 and the second resonator 16 in the Z-axis direction. The connection line path 20A is connected to each of the first resonator 14 and the second resonator 16. Specifically, the connection line path 20A has one end connected to a side of the first resonator 14 parallel to the Y-axis direction and the other end connected to a side of the second resonator 16 parallel to the Y-axis direction. Although the connection line path 20A passes through the through-hole 18*a*, the connection line path 20A is not in contact with the reference conductor 18.

The connection line path 20B may be made of a conductor. The connection line path 20B is located between the first resonator 14 and the second resonator 16 in the Z-axis direction. The connection line path 20B is connected to each of the first resonator 14 and the second resonator 16. Specifically, the connection line path 20B has one end connected to a side of the first resonator 14 parallel to the X-axis direction and the other end connected to a side of the second resonator 16 parallel to the X-axis direction. Although the connection line path 20B passes through the through-hole 18*b*, the connection line path 20B is not in contact with the reference conductor 18.

Figure 9:
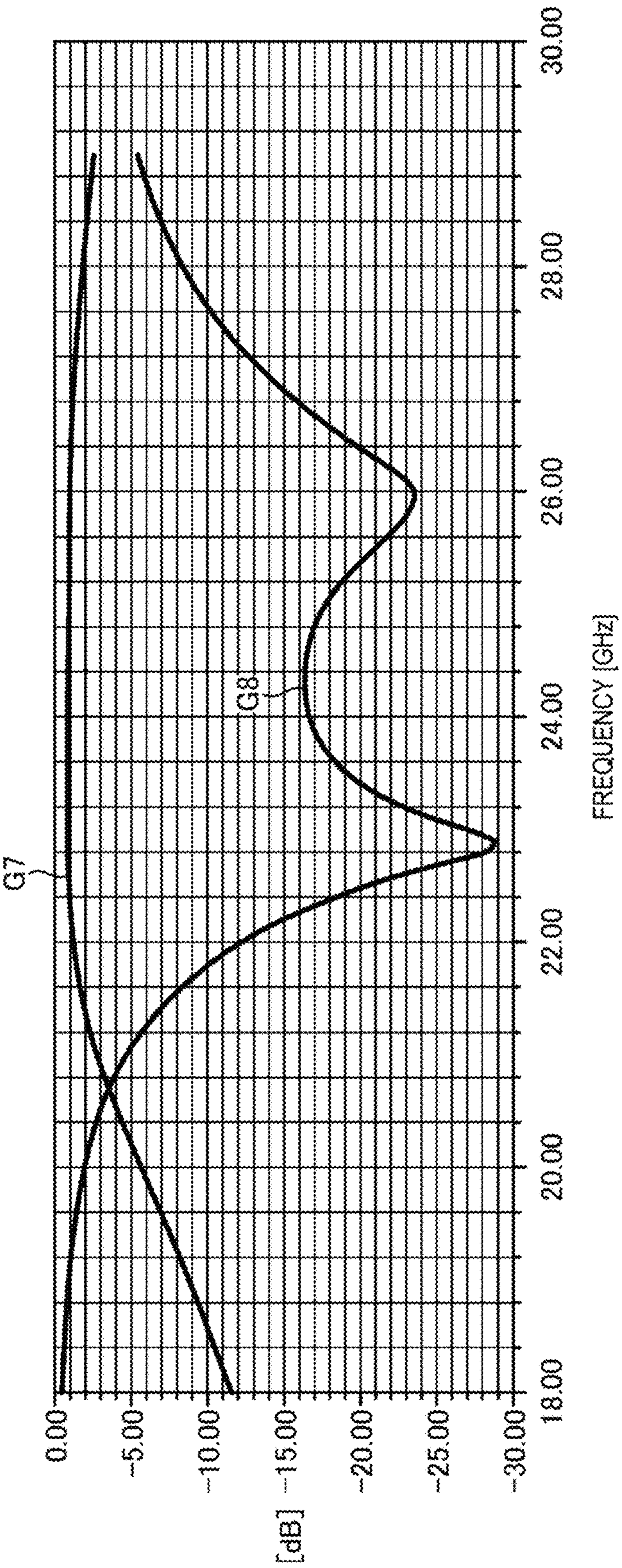
FIG. 9 is a graph showing frequency characteristics of the unit structure according to the third embodiment.
Figure 10:
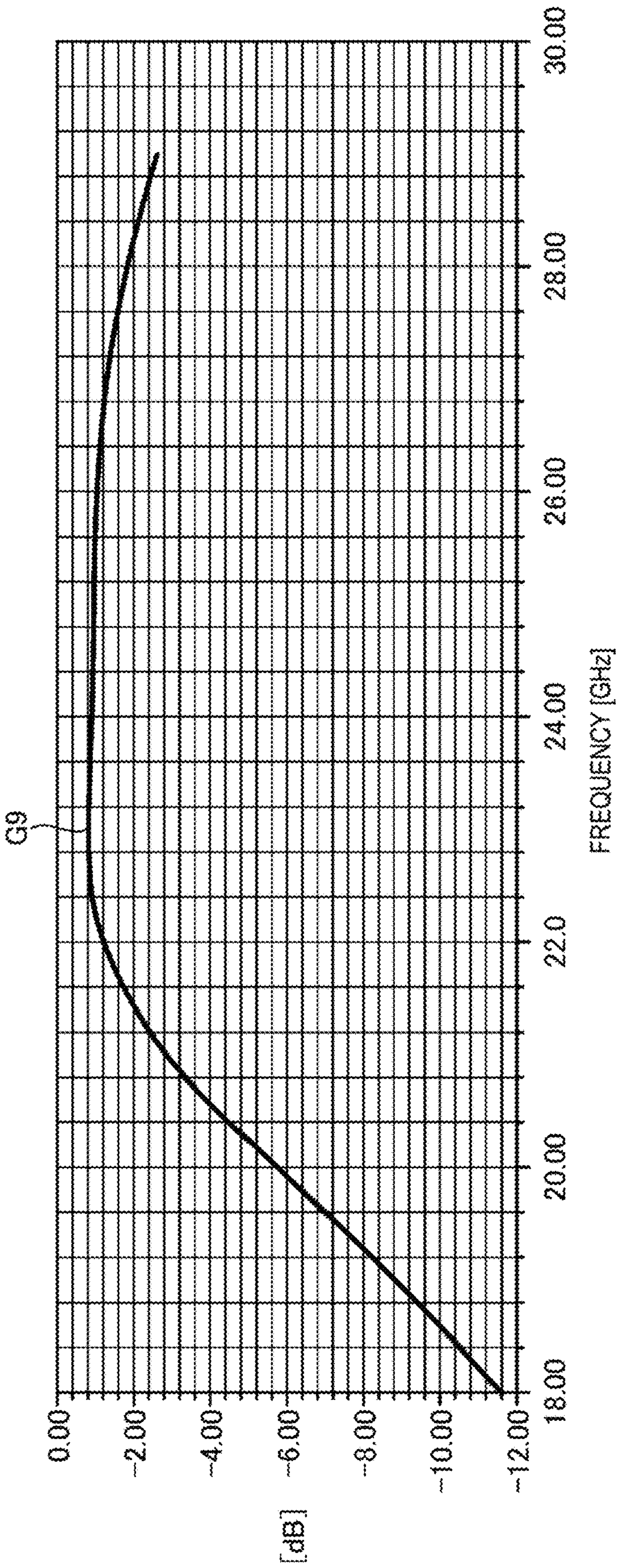
FIG. 10 is a graph showing frequency characteristics of the unit structure according to the third embodiment.

Frequency characteristics of the unit structure according to the third embodiment will be described with reference to FIGS. 9 and 10. FIGS. 9 and 10 are graphs showing the frequency characteristics of the unit structure according to the third embodiment.

In FIG. 9, the horizontal axis represents the frequency [GHz] and the vertical axis represents the gain [dB]. FIG. 9 shows a graph G7 and a graph G8. The graph G7 shows a transmission coefficient when the electromagnetic wave incident from the X-axis direction is radiated in the X-axis direction. The graph G8 shows a reflection coefficient. The graph G7 shows that insertion loss in a region from around 21.00 GHz to around 28.00 GHz is about −3 dB or more and transmission characteristics are satisfactory. The graph G8 shows that the reflection coefficient in the region from around 21.00 GHz to around 28.00 GHz is low. That is, the unit structure 10B illustrated in FIG. 8 has satisfactory transmission characteristics over a wide range from around 21.00 GHz to around 28.00 GHz.

In FIG. 10, the horizontal axis represents the frequency [GHz] and the vertical axis represents the gain [dB]. FIG. 10 shows a graph G9. The graph G9 shows a transmission coefficient when the electromagnetic wave incident from the X-axis direction is radiated in the Y-axis direction. As shown in the graph G9, in the transmission coefficient when the electromagnetic wave incident from the X-axis direction is radiated in the Y-axis direction, the insertion loss in a region from around 21.00 GHz to around 28.00 GHz is about −3 dB or more and transmission characteristics are satisfactory.

The unit structure 10B has satisfactory transmission coefficients of the electromagnetic wave from the X-axis direction to the X-axis direction and from the X-axis direction to the Y-axis direction. That is, the unit structure 10B functions as a spatial filter and has a polarizing function.

Fourth Embodiment

Configuration of Unit Structure

A configuration of the unit structure according to a fourth embodiment will be described with reference to FIG. 11.

Figure 11:
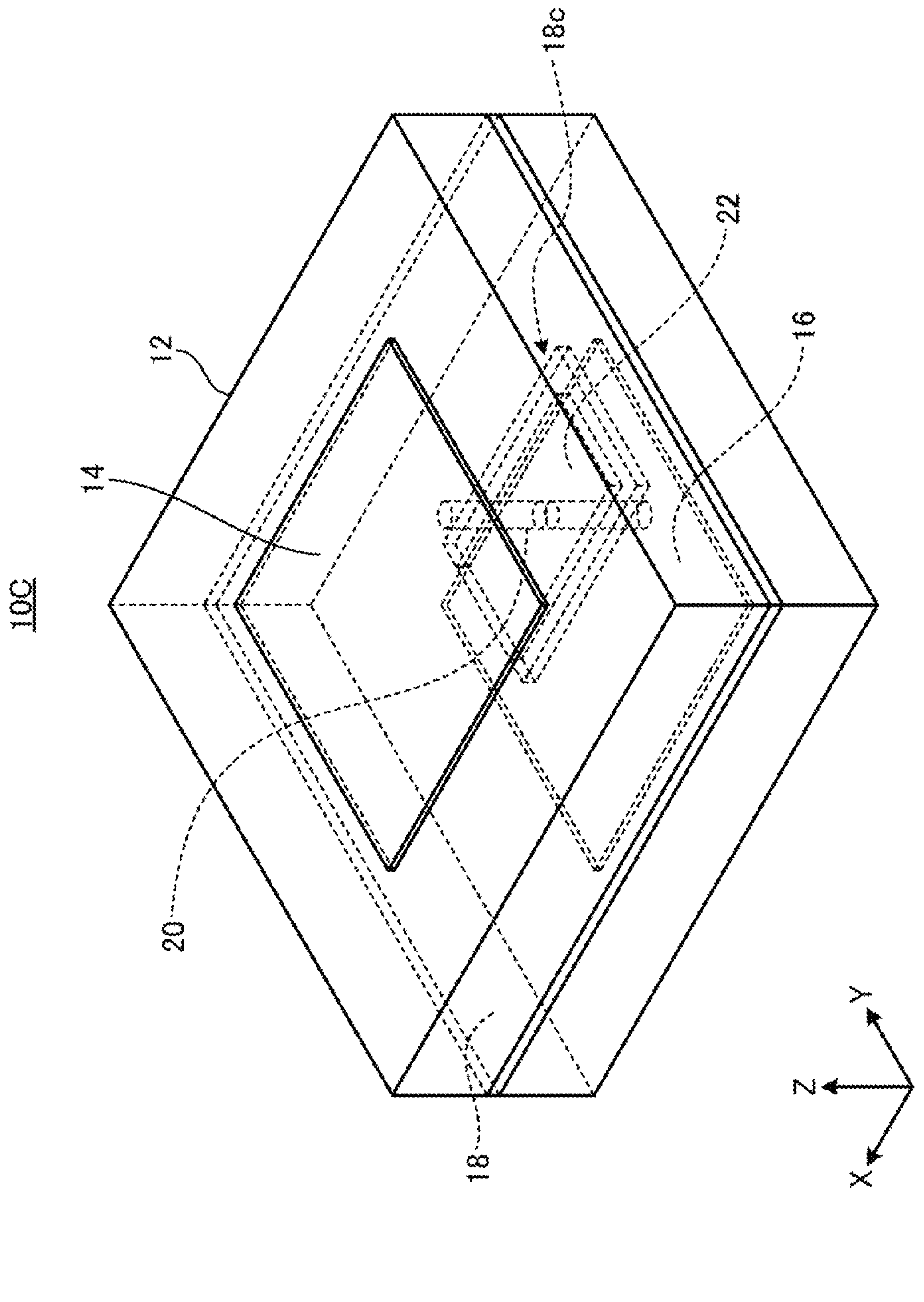
FIG. 11 is a diagram illustrating a configuration of a unit structure according to a fourth embodiment.

FIG. 11 is a diagram illustrating a configuration of the unit structure according to the fourth embodiment.

As illustrated in FIG. 11, a unit structure 10C includes the substrate 12 the first resonator 14, the second resonator 16, the reference conductor 18, the connection line path 20 and a third resonator 22. The unit structure 10C differs from the unit structure 10 illustrated in FIG. 2 in that the unit structure 10C includes the third resonator 22. In the unit structure 10C, the reference conductor 18 includes an opening portion 18*c* surrounding the third resonator 22.

The third resonator 22 may be located between the first resonator 14 and the second resonator 16 in the Z-axis direction. The third resonator 22 may be located within the opening portion 18*c* of the reference conductor 18. The third resonator 22 may be located within the opening portion 18*c* so as not to be in contact with the reference conductor 18. That is, the third resonator 22 is surrounded by the reference conductor 18. The third resonator 22 is capacitively connected to the reference conductor 18.

In the present embodiment, when a wavelength of a fundamental wave of an incoming electromagnetic wave is A, a length of at least one side of the first resonator 14 is set to λ/2, a length of at least one side of the second resonator 16 is set to λ/2, and a length of at least one side of the third resonator 22 is set to λ/4.

Figure 12:
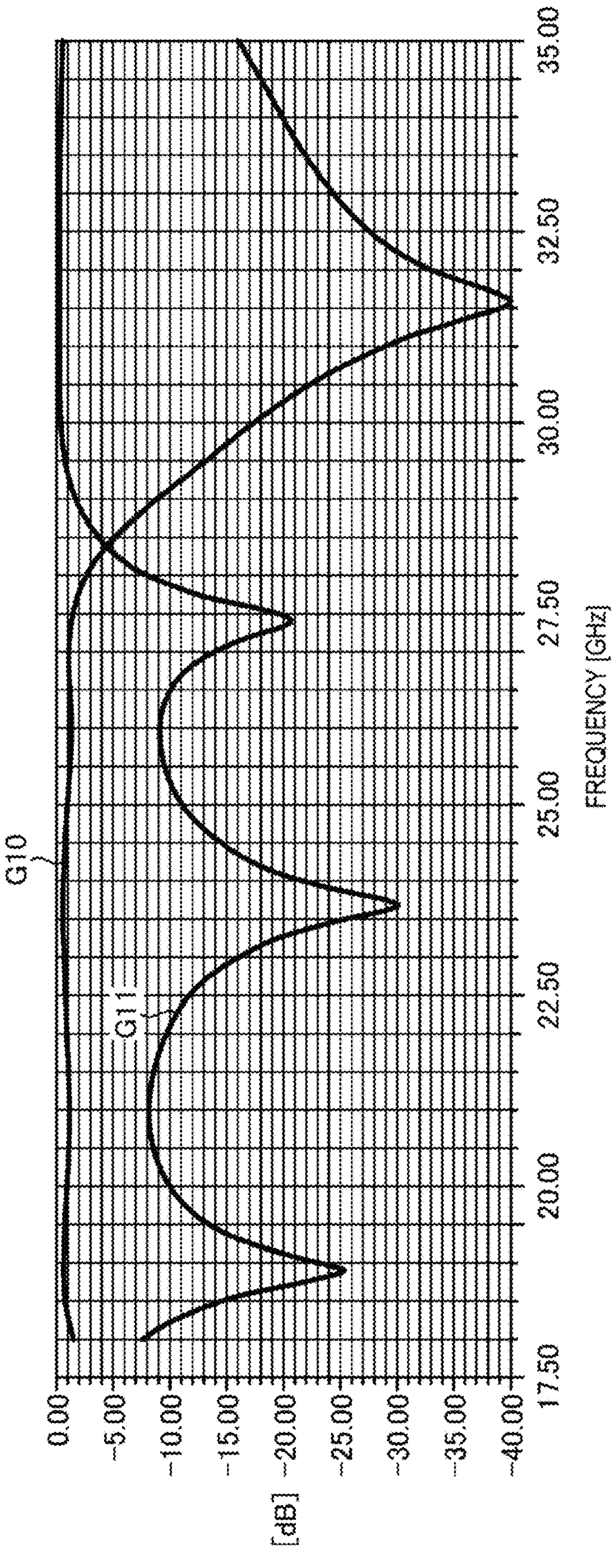
FIG. 12 is a graph showing frequency characteristics of the unit structure according to the fourth embodiment.

Frequency characteristics of the unit structure according to the fourth embodiment will be described with reference to FIG. 12. FIG. 12 is a graph showing frequency characteristics of the unit structure according to the fourth embodiment.

In FIG. 12, the horizontal axis represents the frequency [GHz] and the vertical axis represents the gain [dB]. FIG. 12 shows a graph G10 and a graph G11. The graph G10 shows the transmission coefficient from the X-axis direction to the X-axis direction. The graph G11 shows the reflection coefficient of the electromagnetic wave incident in the X-axis direction. The graph G10 shows that the insertion loss in a region from around 18.00 GHz to around 28.00 GHz is −2 dB or more and transmission characteristics are satisfactory. The graph G11 shows that the reflection coefficient in the region from around 18.00 GHz to around 28.00 GHz is low. As shown in the graph G10, the unit structure 10C has a steep attenuation characteristic in a higher frequency band than in the unit structure 10 illustrated in FIG. 2. That is, the unit structure 10C illustrated in FIG. 11 has satisfactory transmission characteristics over a wide range from around 18.00 GHz to around 28.00 GHz.

Figure 13:
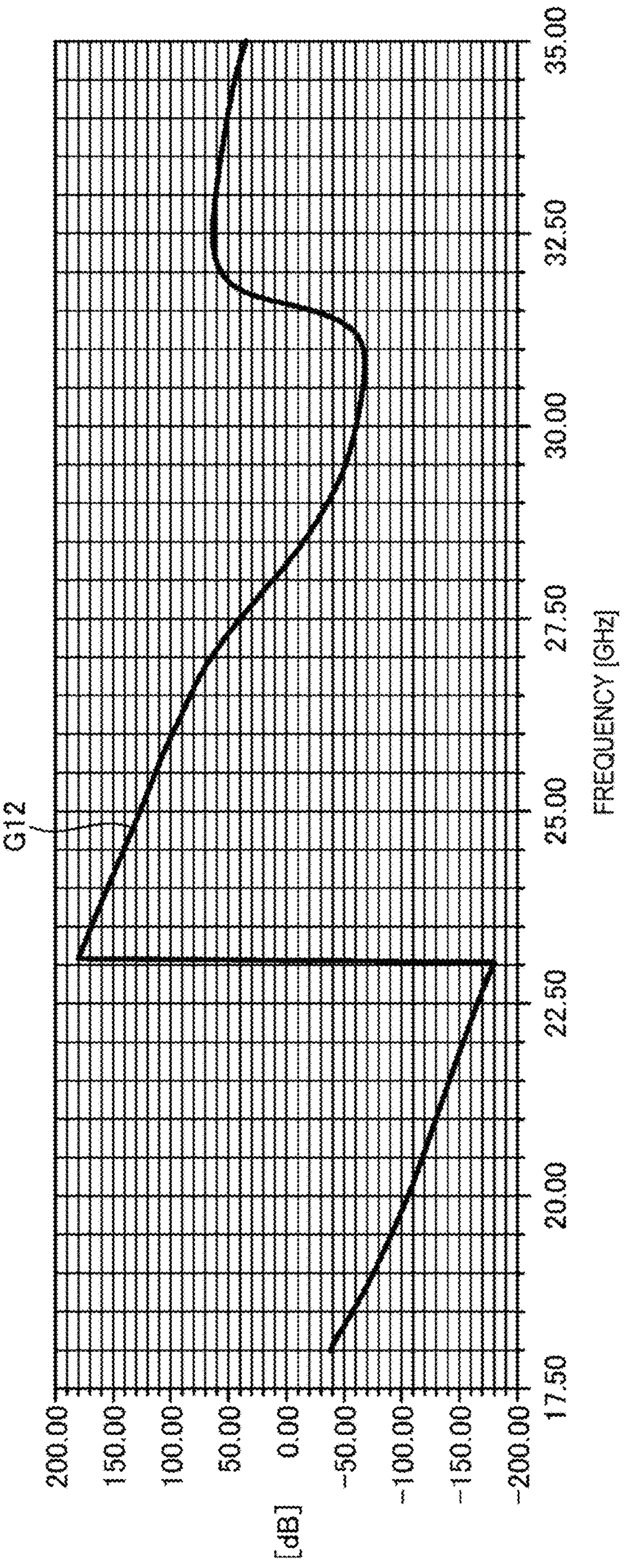
FIG. 13 is a graph showing an amount of change in phase of the unit structure according to the fourth embodiment.

An amount of change in phase of the unit structure according to the fourth embodiment will be described with reference to FIG. 13. FIG. 13 is a graph showing the amount of change in phase of the unit structure according to the fourth embodiment.

In FIG. 13, the horizontal axis represents the frequency [GHz] and the vertical axis represents the gain [dB]. FIG. 13 shows a graph G12. The graph G12 shows the amount of shift in phase of the electromagnetic wave when the electromagnetic wave incident on the first resonator 14 is radiated from the second resonator 16. For example, when the electromagnetic wave having a frequency around 18.00 GHz is incident on the first resonator 14, the unit structure 10C shifts the phase of the electromagnetic wave by about −37° and radiates the electromagnetic wave from the second resonator 16. For example, when the electromagnetic wave having a frequency around 27.50 GHz is incident on the first resonator 14, the unit structure 10C shifts the phase of the electromagnetic wave by about −40° and radiates the electromagnetic wave from the second resonator 16. That is, even when a plurality of the resonators are provided as in the unit structure 10C, the incoming electromagnetic wave can be shifted.

Variation of Fourth Embodiment

In the unit structure 10C, by changing the designs of the first resonator 14, the second resonator 16, and the third resonator 22, the amount of change in phase and the frequency band in which the phase is changed can be changed.

Figure 14:
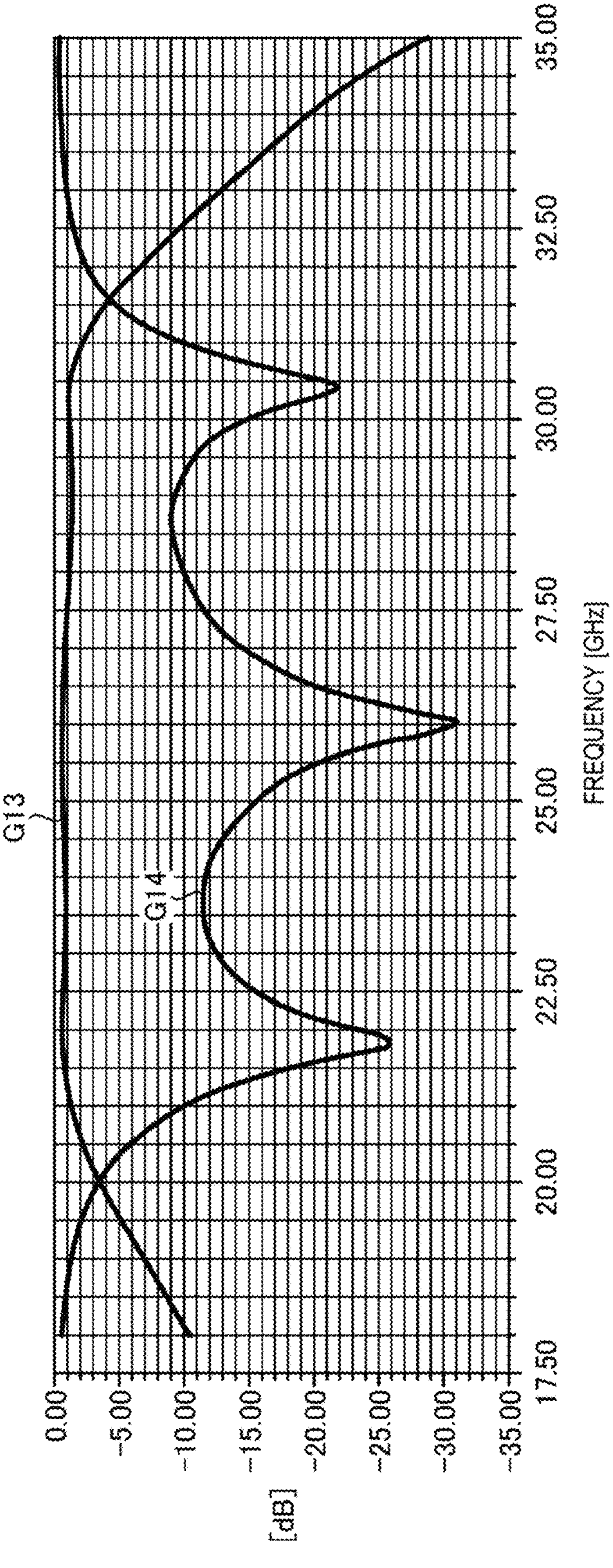
FIG. 14 is a graph showing frequency characteristics of the unit structure according to a variation of the fourth embodiment.

Frequency characteristics of the unit structure according to a variation of the fourth embodiment will be described with reference to FIG. 14. FIG. 14 is a graph showing frequency characteristics of the unit structure according to a variation of the fourth embodiment.

In FIG. 14, the horizontal axis represents the frequency [GHz] and the vertical axis represents the gain [dB]. FIG. 14 shows a graph G13 and a graph G14. The graph G13 shows the transmission coefficient from the X-axis direction to the X-axis direction. The graph G13 shows the reflection coefficient of the electromagnetic wave incident in the X-axis direction. The graph G13 shows that the insertion loss in a region from around 21.00 GHz to around 28.00 GHz is −2 dB or more and transmission characteristics are satisfactory. The graph G13 shows that the reflection coefficient in the region from around 21.00 GHz to around 28.00 GHz is low. That is, the unit structure 10C illustrated in FIG. 11 has satisfactory transmission characteristics over a wide range from around 21.00 GHz to around 28.00 GHz.

Figure 15:
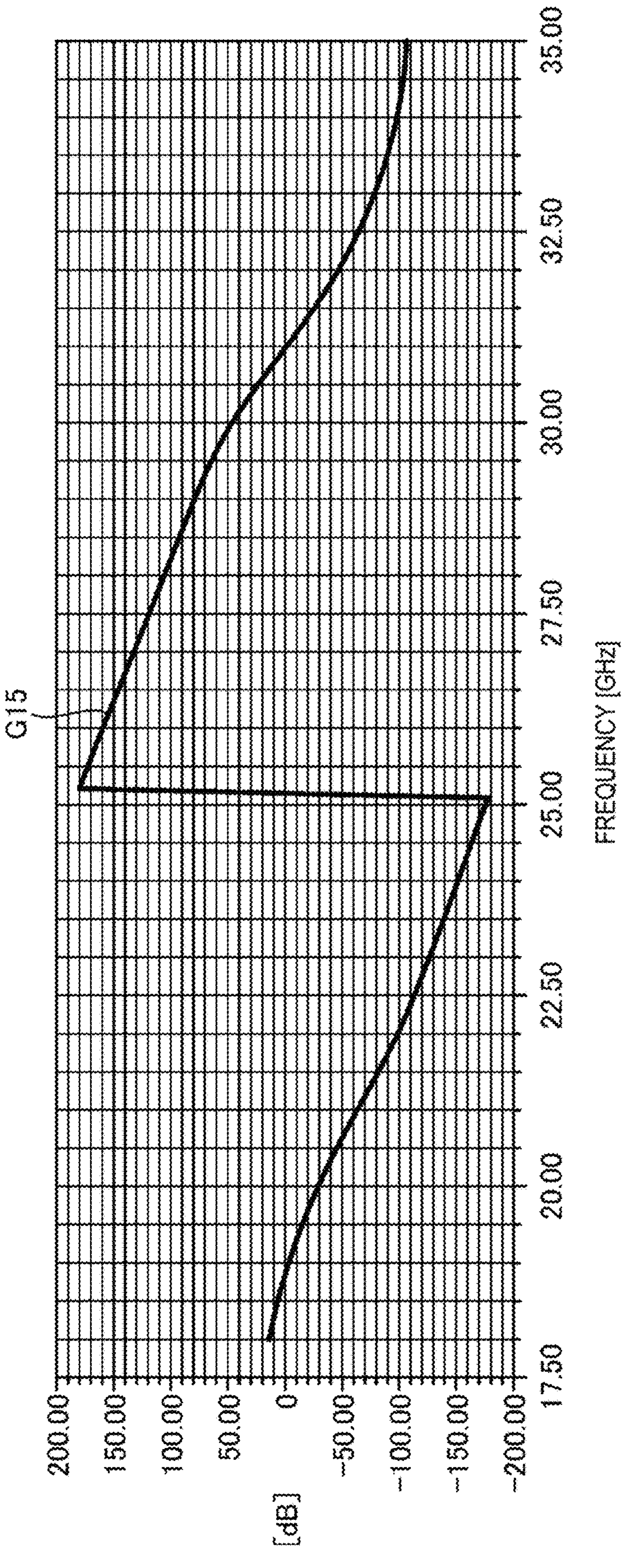
FIG. 15 is a graph showing an amount of change in phase of the unit structure according to the variation of the fourth embodiment.

An amount of change in phase of the unit structure according to a variation of the fourth embodiment will be described with reference to FIG. 15. FIG. 15 is a graph showing the amount of change in phase of the unit structure according to the variation of the fourth embodiment.

In FIG. 15, the horizontal axis represents the frequency [GHz] and the vertical axis represents the gain [dB]. FIG. 15 shows a graph G15. The graph G15 shows the amount of shift in phase of the electromagnetic wave when the electromagnetic wave incident on the first resonator 14 is radiated from the second resonator 16. For example, when the electromagnetic wave having a frequency around 21.00 GHz is incident on the first resonator 14, the unit structure 10C shifts the phase of the electromagnetic wave by about −55° and radiates the electromagnetic wave from the second resonator 16. For example, when the electromagnetic wave having a frequency around 27.50 GHz is incident on the first resonator 14, the unit structure 10C shifts the phase of the electromagnetic wave by about 117° and radiates the electromagnetic wave from the second resonator 16. That is, even when a plurality of the resonators are provided as in the unit structure 10C, the incoming electromagnetic wave can be shifted.

In the example illustrated in FIG. 11, the unit structure 10C includes three resonators, but the present disclosure is not limited thereto. In the present disclosure, the composite resonator may include three or more resonators. In the present disclosure, by increasing the number of resonators, a steeper attenuation characteristic can be provided in a high frequency band.

Embodiments of the present disclosure have been described above, but the present disclosure is not limited by the contents of the embodiments. Constituent elements described above include those that can be easily assumed by a person skilled in the art, those that are substantially identical to the constituent elements, and those within a so-called range of equivalency. The constituent elements described above can be combined as appropriate. Various omissions, substitutions, or modifications of the constituent elements can be made without departing from the spirit of the above-described embodiments.

The invention claimed is:

1. A composite resonator, comprising:

a first resonator being planar extending along a first plane direction;

a second resonator being planar spaced apart from the first resonator along a first direction crossing the first plane direction, the second resonator extending along the first plane direction;

a third resonator located between the first resonator and the second resonator along the first direction and configured to magnetically or capacitively connect to or electrically connect to each of the first resonator and the second resonator; and a reference conductor extending along the first plane direction, located between the first resonator and the second resonator in the first direction, and serving as a potential reference of the first resonator and the second resonator, wherein the reference conductor surrounds at least a part of the third resonator in the first plane direction, and the first resonator is configured to radiate an electromagnetic wave during resonance.

2. The composite resonator according to claim 1, wherein the first resonator is configured to radiate the electromagnetic wave toward one side of the first direction during resonance.

3. A composite resonator, comprising:

a first resonator being planar extending along a first plane direction;

a second resonator being planar spaced apart from the first resonator along a first direction crossing the first plane direction, the second resonator extending along the first plane direction;

a third resonator located between the first resonator and the second resonator along the first direction and configured to magnetically or capacitively connect to or electrically connect to each of the first resonator and the second resonator; and a reference conductor extending along the first plane direction, located between the first resonator and the second resonator in the first direction, and serving as a potential reference of the first resonator and the second resonator, wherein the reference conductor surrounds at least a part of the third resonator in the first plane direction, and an entirety of the third resonator is covered with the first resonator and the second resonator in the first direction.

4. The composite resonator according to claim 3, wherein the third resonator comprises a plurality of sub-resonators, and the plurality of sub-resonators is configured to magnetically or capacitively connect to or electrically connect to at least any other sub-resonator.

5. The composite resonator according to claim 3, wherein the first resonator is configured to resonate by receiving an electromagnetic wave from one side of the first direction.

6. The composite resonator according to claim 5, wherein the second resonator is configured to radiate an electromagnetic wave during resonance.

7. The composite resonator according to claim 5, wherein the second resonator is configured to radiate an electromagnetic wave toward another side of the first direction opposite to the one side during resonance.

8. The composite resonator according to claim 5, wherein the second resonator is configured to resonate by receiving an electromagnetic wave from another side of the first direction opposite to the one side.

9. The composite resonator according to claim 8, wherein the second resonator is configured to change a resonance direction with time in the first plane direction with respect to a resonance direction of the first resonator.

10. An assembly, comprising:

a plurality of the composite resonators according to claim 3, wherein the plurality of composite resonators is arranged in the first plane direction.

11. The composite resonator according to claim 8, wherein the second resonator is configured to resonate at a phase different from a phase of the first resonator.

12. The composite resonator according to claim 8, wherein the second resonator is configured to resonate in an in-plane direction different from an in-plane direction of the first resonator in the first plane direction.

13. The composite resonator according to claim 8, wherein the second resonator is configured to radiate an electromagnetic wave received by the first resonator with a first frequency band being attenuated.

14. A composite resonator, comprising:

a first resonator being planar extending along a first plane direction;

a second resonator being planar spaced apart from the first resonator along a first direction crossing the first plane direction, the second resonator extending along the first plane direction;

a third resonator located between the first resonator and the second resonator along the first direction and configured to magnetically or capacitively connect to or electrically connect to each of the first resonator and the second resonator; and a reference conductor extending along the first plane direction, located between the first resonator and the second resonator in the first direction, and serving as a potential reference of the first resonator and the second resonator, wherein the reference conductor surrounds at least a part of the third resonator in the first plane direction, the reference conductor comprises a through-hole, and the third resonator is configured to magnetically or capacitively connect to or electrically connect to each of the first resonator and the second resonator through the through-hole.

* * * * *